United States Patent
Mariucci

(10) Patent No.: US 9,243,580 B2
(45) Date of Patent: Jan. 26, 2016

(54) METHOD AND SYSTEM FOR REDUCING SOOT FORMED BY AN ENGINE

(75) Inventor: Vincent Edward Mariucci, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 721 days.

(21) Appl. No.: 13/314,081

(22) Filed: Dec. 7, 2011

(65) Prior Publication Data

US 2013/0151119 A1 Jun. 13, 2013

(51) Int. Cl.
| | |
|---|---|
| *F02D 41/40* | (2006.01) |
| *F02M 25/08* | (2006.01) |
| *F02D 13/02* | (2006.01) |
| *F02D 41/00* | (2006.01) |
| *F02B 75/12* | (2006.01) |
| *F02D 41/18* | (2006.01) |

(52) U.S. Cl.
CPC .......... *F02D 41/402* (2013.01); *F02D 13/0219* (2013.01); *F02D 41/0042* (2013.01); *F02M 25/089* (2013.01); *F02B 2075/125* (2013.01); *F02D 13/0265* (2013.01); *F02D 41/182* (2013.01); *F02D 2250/38* (2013.01); *Y02T 10/123* (2013.01); *Y02T 10/18* (2013.01); *Y02T 10/44* (2013.01)

(58) Field of Classification Search
CPC ... F02M 25/089; F02M 25/08; F02M 69/044; F02M 25/0836; F02M 55/00; F02M 69/046; F02D 41/0032; F02D 19/081; F02D 19/061; F02D 41/003; F02D 41/402; F02D 41/30
USPC .......... 701/104, 103; 123/299, 300, 698, 516, 123/518, 520, 672, 525, 304, 519, 575, 123/406.47
See application file for complete search history.

(56) References Cited

U.S. PATENT DOCUMENTS

| | | | | |
|---|---|---|---|---|
| 4,886,026 | A | | 12/1989 | Cook |
| 5,249,561 | A | * | 10/1993 | Thompson .......... F02D 41/0032 123/494 |
| 5,366,151 | A | * | 11/1994 | King .................... B60H 1/2206 237/12.3 C |
| 5,373,822 | A | * | 12/1994 | Thompson .......... F02D 41/0032 123/494 |
| 5,676,118 | A | | 10/1997 | Saito |
| 6,234,153 | B1 | * | 5/2001 | DeGroot ............. F02D 41/0042 123/520 |
| 6,278,933 | B1 | * | 8/2001 | Buckland ............ F02D 13/0215 123/305 |
| 6,374,812 | B1 | * | 4/2002 | Wiese ................. F02D 41/0032 123/520 |
| 6,644,291 | B2 | * | 11/2003 | Stroh .................. F02D 41/0042 123/674 |
| 6,868,837 | B2 | * | 3/2005 | Ament ................ F02D 41/0035 123/491 |
| 6,913,004 | B2 | * | 7/2005 | Pellizzari .............. F02D 41/003 123/549 |
| 6,913,005 | B2 | * | 7/2005 | Linna .................... F02D 41/003 123/549 |
| 7,032,576 | B2 | * | 4/2006 | Linna .................... F02D 41/003 123/549 |

(Continued)

FOREIGN PATENT DOCUMENTS

EP 0489493 A2 10/1991

*Primary Examiner* — Lindsay Low
*Assistant Examiner* — John Bailey
(74) *Attorney, Agent, or Firm* — Julia Voutyras; Alleman Hall McCoy Russell & Tuttle LLP

(57) ABSTRACT

An engine system and method for reducing soot produced by an engine is disclosed. In one example, during purging of stored fuel vapors, a number of fuel injections to a cylinder during a cylinder cycle are maximized to reduce soot formation. The system and method may reduce soot formation within an engine.

20 Claims, 5 Drawing Sheets

(56) References Cited

U.S. PATENT DOCUMENTS

| | | | | |
|---|---|---|---|---|
| 7,080,626 B2* | 7/2006 | Ament | F02D 41/003 | 123/179.18 |
| 7,131,430 B2* | 11/2006 | Rado | F02B 63/02 | 123/520 |
| 7,305,975 B2* | 12/2007 | Reddy | F02D 41/0045 | 123/518 |
| 7,424,881 B2* | 9/2008 | Kerns | F02D 19/084 | 123/431 |
| 7,428,895 B2* | 9/2008 | Leone | F02D 19/0692 | 123/198 D |
| 7,461,628 B2* | 12/2008 | Blumberg | F02B 11/00 | 123/304 |
| 7,484,500 B2* | 2/2009 | Terada | F02M 25/089 | 123/516 |
| 7,603,990 B2* | 10/2009 | Takakura | F02D 41/0042 | 123/520 |
| 7,690,370 B2* | 4/2010 | Mino | F02D 41/0045 | 123/516 |
| 7,809,491 B1* | 10/2010 | Bevan | F02D 41/0032 | 123/480 |
| 7,849,842 B1 | 12/2010 | Lewis et al. | | |
| 7,942,134 B2* | 5/2011 | Peters | F02D 41/0032 | 123/520 |
| 7,971,567 B2* | 7/2011 | Zubeck | F02B 1/02 | 123/304 |
| 8,312,860 B2* | 11/2012 | Yun | F02B 1/12 | 123/295 |
| 8,434,461 B2* | 5/2013 | Kerns | F02M 25/08 | 123/520 |
| 2002/0129802 A1* | 9/2002 | Hayashi | F02D 41/0032 | 123/698 |
| 2005/0240336 A1* | 10/2005 | Reddy | F02D 41/0045 | 701/103 |
| 2006/0243243 A1* | 11/2006 | Fukasawa | F02D 41/1498 | 123/299 |
| 2007/0215111 A1* | 9/2007 | Surnilla | F02D 19/088 | 123/431 |
| 2007/0227514 A1* | 10/2007 | Terada | F02M 25/089 | 123/519 |
| 2009/0306877 A1* | 12/2009 | Sasaki | F02D 41/182 | 701/104 |
| 2012/0004833 A1* | 1/2012 | Koch | F02D 41/024 | 701/104 |
| 2012/0046853 A1* | 2/2012 | Silvestri | F02D 41/0087 | 701/104 |
| 2012/0116654 A1* | 5/2012 | Toyohara | F02D 41/247 | 701/104 |
| 2012/0116655 A1* | 5/2012 | Bidner | F02D 41/0025 | 701/104 |
| 2012/0136555 A1* | 5/2012 | Okamoto | F02D 41/047 | 701/104 |
| 2012/0191324 A1* | 7/2012 | Surnilla | F02D 19/0644 | 701/104 |

* cited by examiner

METHOD AND SYSTEM FOR REDUCING SOOT FORMED BY AN ENGINE

BACKGROUND/SUMMARY

Soot may be formed in an engine where fuel is directly injected to cylinders of the engine. Specifically, soot may form when fuel is injected to an engine cylinder while the engine is operating at higher speeds and loads. The soot may form from incomplete combustion of hydrocarbons since there is less time available to atomize fuel injected to the cylinder at higher engine speeds. Soot formation may also be influenced by introducing hydrocarbons to the cylinder via purging fuel vapors stored in a fuel vapor storage canister. In particular, since the purged fuel vapors may be combined with air entering the engine before the air enters the cylinder, it may be more difficult for fuel injected to the cylinder to vaporize and combine with the air-fuel mixture entering the cylinder. Consequently, an amount of soot produced by an engine may increase when stored fuel vapors are purged to the engine.

The inventor herein has recognized the above-mentioned limitations and has developed a method for operating an engine, comprising: supplying an amount of fuel from a fuel vapor storage canister to a cylinder; and adjusting a number of fuel pulses supplied to the cylinder via a fuel injector during a cycle of the cylinder in response to the amount of fuel supplied to the cylinder during the cylinder cycle from the fuel vapor storage canister.

By supplying fuel to a cylinder in a number of fuel pulses while fuel is also supplied to the cylinder via a fuel vapor storage canister, it may be possible to reduce soot formation in the combusted products of the cylinder. In particular, soot formation of a cylinder may be reduced by performing multiple injections of fuel during a cylinder cycle. In one example, a number of fuel pulses supplied to a cylinder during a cylinder cycle may be maximized to promote fuel vaporization even though a mixture of air and fuel enters the cylinder via an intake valve of the cylinder.

The present description may provide several advantages. In particular, the approach may provide reduced soot formation in combustion byproducts. In addition, the method may reduce engine system cost by reducing the possibility of having to provide a particulate trap for the engine. Further, if the engine system includes a particulate filter, the particulate filter may need to be regenerated less frequently when the approach is applied.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
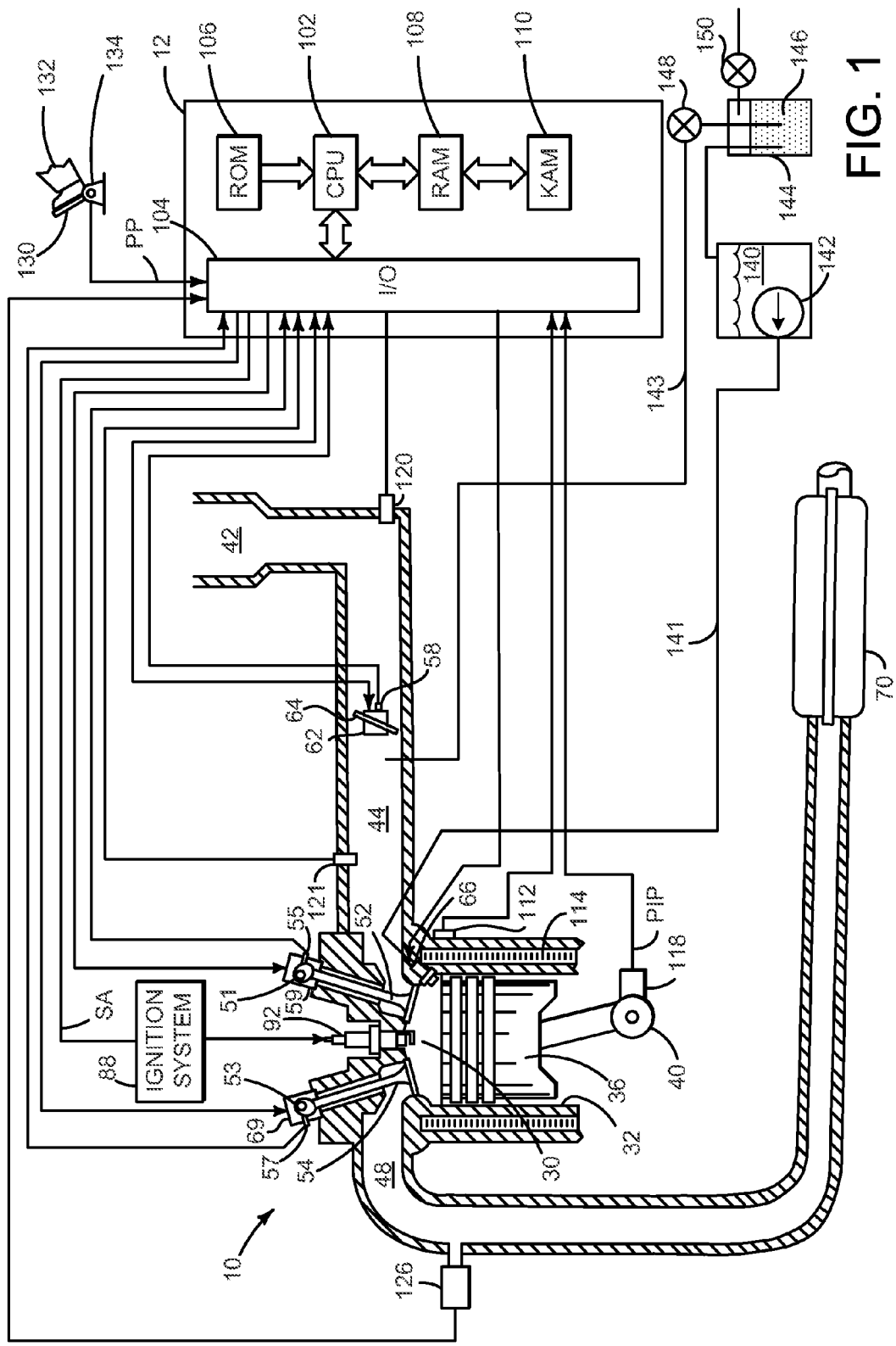
FIG. 1 shows a schematic depiction of an engine.
Figure 2:
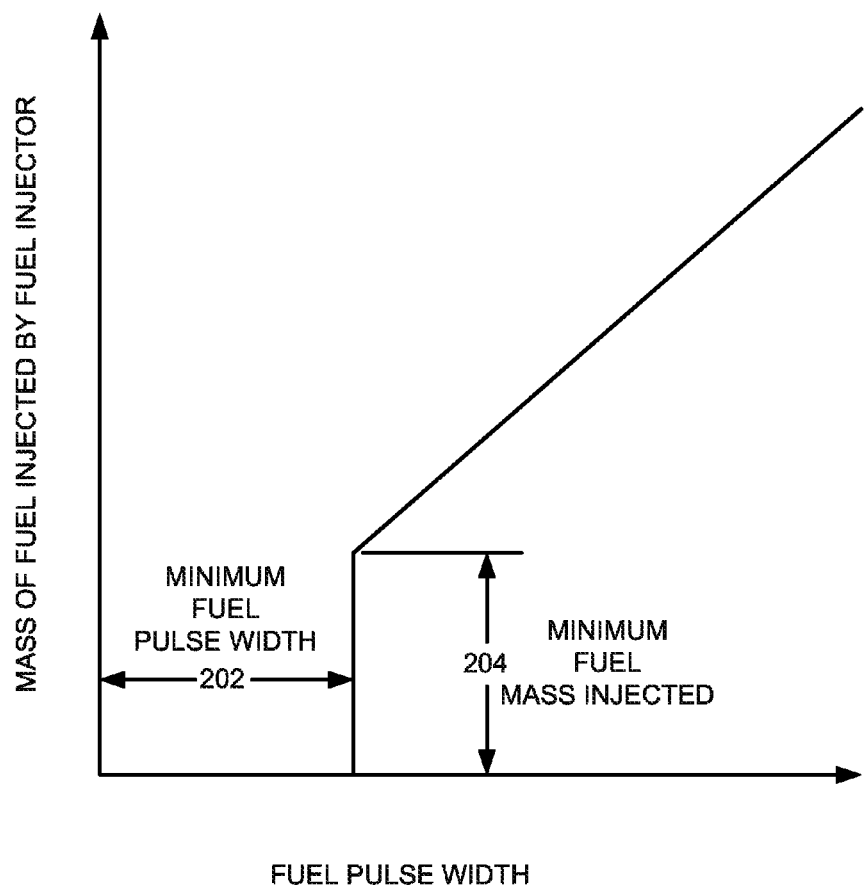
FIG. 2 shows an example fuel injector transfer function.
Figure 3:
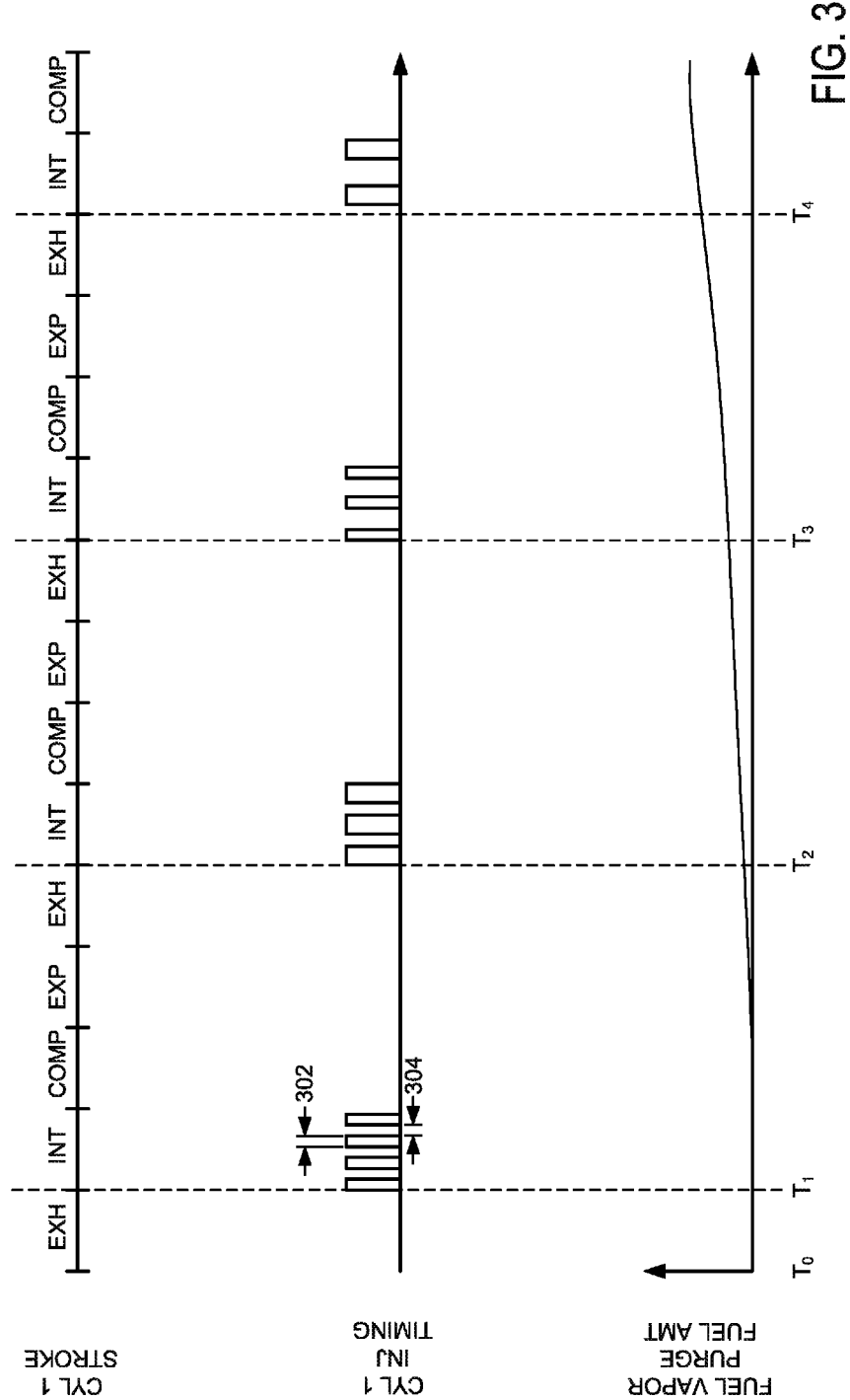
FIGS. 3 and 4 show example fuel injection sequences when fuel vapors are supplied to a cylinder.
Figure 4:
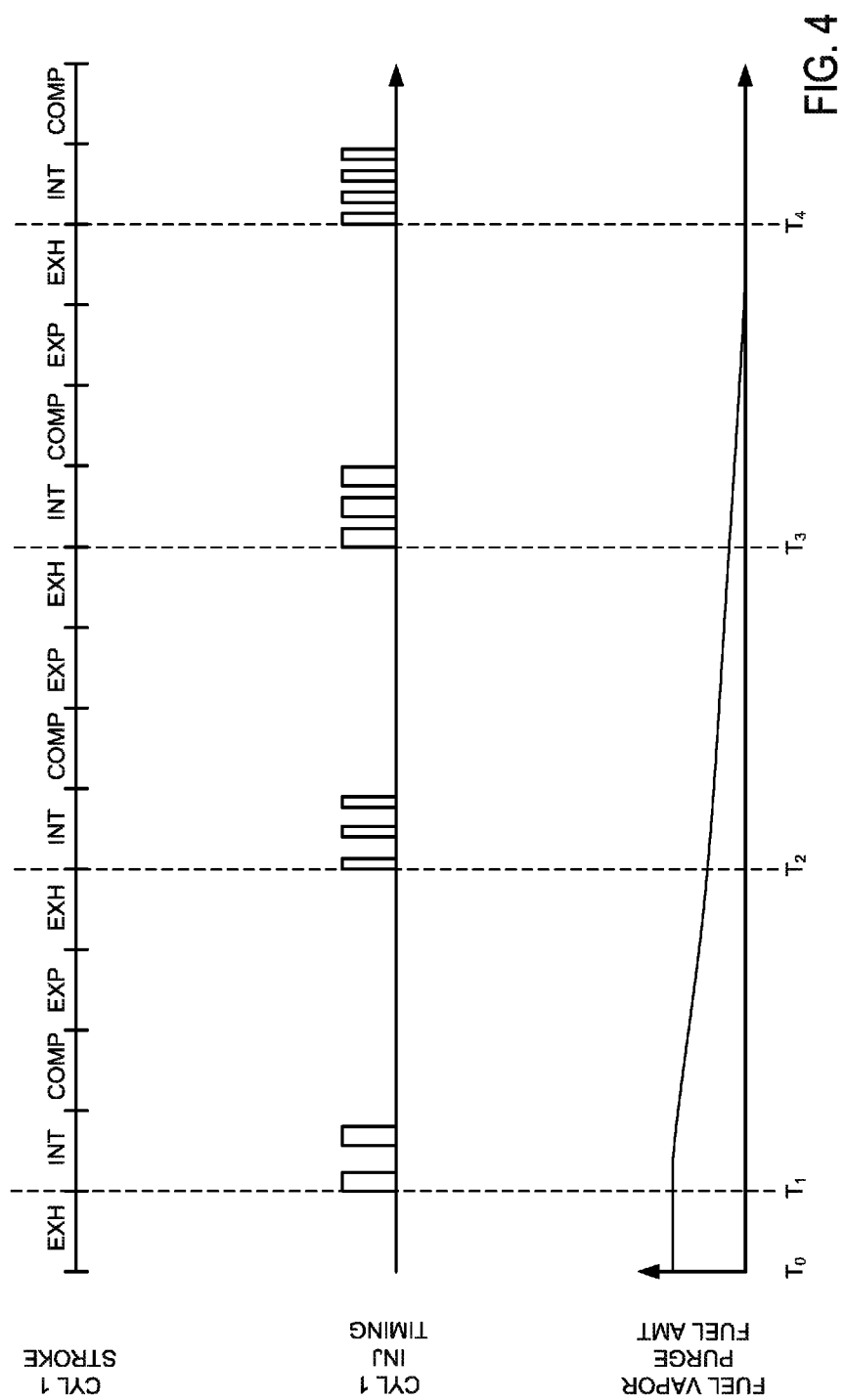

The present description is related to controlling fuel injection to a cylinder to reduce soot formation within the cylinder. In one example, a fuel injector supplying fuel to a cylinder of an engine as illustrated in FIG. 1 may be adjusted according to the description. Timing of opening the fuel injector may be adjusted as shown in FIGS. 3 and 4. In one example, timing of opening the fuel injector may be based on a minimum fuel injector pulse width as shown in FIG. 2. The method of FIG. 5 may be the basis for adjusting fuel injector operation as shown in FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The phase of intake cam 51 and exhaust cam 53 may be adjusted via cam phase actuators 59 and 69. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to a pulse width from controller 12. Fuel is delivered to fuel injector 66 by a fuel system including a fuel tank 140, fuel pump 142, fuel line 141, and fuel rail (not shown). Fuel injector 66 is supplied operating current from controller 12. Fuel vapors from fuel tank 140 may be stored in fuel vapor canister 144 which includes activated carbon 146 or another hydrocarbon storage media. Fuel vapors enter fuel vapor storage canister 144 from fuel tank 140 via conduit 151 when vent valve 150 is open or when fuel vapors are drawn into intake manifold 44 via purge line 143 and purge valve 148. In addition, intake manifold 44 is shown communicating with optional electronic throttle 62 which adjusts a position of throttle plate 64 to control air flow from air inlet 42.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. In some examples, exhaust gas after treatment device 70 is a particulate filter and/or a three-way catalyst. In other examples, exhaust gas after treatment device 70 is solely a three-way catalyst.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for controlling an engine, comprising: an engine; a fuel vapor storage canister; a fuel injector supplying fuel to a cylinder of the engine; a controller including instructions for injecting fuel to the cylinder in a number of fuel pulses during a cycle of the cylinder, the controller including further instructions to supply fuel to the cylinder via the fuel vapor storage canister, the controller including further instructions to adjust the number of fuel pulses during a cylinder cycle in response to an amount of fuel delivered when the fuel injector is operated at a minimum pulse width. In this way, the number of fuel injections during a cylinder cycle may be related to a characteristic of the fuel injector.

The system further comprises additional instructions to maximize the number of fuel pulses during the cycle of the cylinder. In some examples, the system further comprises an air intake system supplying air to cylinders of the engine, and where the fuel vapor storage canister is in communication with the air intake system. The system further comprises a fuel vapor purge valve, and where the controller includes further instructions for adjusting a duty cycle of the fuel vapor purge valve to adjust flow of fuel vapors to the cylinder. The system further comprises additional instructions to decrease a pulse width of at least one fuel pulse in response to an amount of fuel supplied to the cylinder via the fuel vapor storage canister. The system further comprises additional instructions for decreasing the number of fuel pulses supplied to the cylinder when at least one fuel pulse supplied to the cylinder is a minimum pulse width of the fuel injector.

Referring now to FIG. 2, a simulated example plot of a transfer function for a fuel injector is shown. The X axis represents fuel injector pulse width where the fuel injector is supplied a rated voltage. For example, a 14 volt rated fuel injector may be supplied a 5 ms 14 volt pulse to open the fuel injector and deliver fuel to a cylinder. The Y axis represents mass of fuel injected by the fuel injector when the injector is supplied voltage at the rated voltage. The transfer function of FIG. 2 may be adjusted for when the fuel injector is supplied voltage less than or greater than the rated injector voltage. For example, the mass of fuel injected may be reduced if the fuel injector is supplied a 10 volt 5 ms pulse width. The transfer function of FIG. 2 may be representative of fuel injector 66 shown in FIG. 1. Further, the transfer function of FIG. 2 may be stored in memory of controller 12 shown in FIG. 1.

FIG. 2 shows that fuel mass is substantially zero until the minimum fuel pulse width 202 is reached. In some examples, the fuel injector may inject a small amount of fuel that is not repeatable for fuel pulse widths less than the minimum fuel pulse width. Therefore, the fuel injector is not operated at fuel pulse widths less than the minimum fuel pulse width. Once a fuel pulse with is supplied to the injector that is at least the minimum fuel pulse width or greater, the injected fuel mass from the fuel injector increases linearly with increasing fuel pulse width. The minimum mass of fuel injected is shown as represented by distance 204. The minimum mass of fuel injected corresponds to the minimum fuel pulse width. It should be noted that the minimum fuel mass injected and the minimum fuel pulse width are design considerations and may vary from one fuel injector design to another fuel injector design.

Referring now to FIG. 3, a simulated fuel injection sequence during increasing of purging of fuel vapors from a fuel vapor storage canister is shown. The sequence of FIG. 3 may be provided by the method of FIG. 5 executed via instructions of controller 12 in the system of FIG. 1.

The first plot from the top of FIG. 3 represents strokes of cylinder number one of a four stroke, four cylinder engine, having a firing order of 1-3-4-2. The exhaust stroke is abbreviated as EXH while respective intake, compression, and expansion strokes are abbreviated as INT, COMP, and EXP.

The second plot from the top of FIG. 3 represents timing of fuel injection events during the respective cylinder strokes of the first plot from the top of FIG. 3. The mass of fuel injected increases with increasing pulse width. The injector on time or pulse width is represented as pulses similar to 302. The injector off time is represented as absences of pulses similar to time at 304. Similarly, the mass of injected fuel decreases with decreasing pulse width.

The third plot from the top of FIG. 3 represents a fuel vapor purge fuel amount entering cylinder number one from a fuel vapor storage canister such as 144 of FIG. 1. The mass of fuel vapor entering cylinder number one increases in the direction of the Y axis arrow.

The sequence is shown over a little more than three cycles of the cylinder; however, the events shown in the sequence may transpire over several minutes during purging of a fuel vapor storage canister. Further, the first, second, and third plots of FIG. 3 occur at the same time and on the same time scale.

The sequence starts at time $T_0$ where the engine is running and cylinder number one begins an exhaust stroke. No fuel is being purged from the fuel vapor storage canister at time $T_0$ and fuel injection is not present during the exhaust stroke.

At time $T_1$, cylinder number one enters an intake stroke and fuel injection to cylinder number one begins. No fuel is being purged from the fuel vapor storage canister at time $T_1$.

During higher engine speeds and loads, fuel that is directly injected to a cylinder may form soot in the cylinder during combustion. One way to reduce or limit soot from fuel that is directly injected to a cylinder may be to inject a desired fuel amount in as many fuel injections during a cylinder cycle as is possible. For example, a single 5 ms fuel pulse may be divided into five 1 ms pulses to improve fuel mixing and reduce soot formed in a cylinder during combustion. The additional fuel injections may help to promote fuel mixing so that less soot may form in cylinder number one. However, the number of fuel injections in a cylinder cycle may be limited by the minimum fuel injector pulse width and/or a minimum fuel injector off time. In some examples, the minimum fuel injector off time may be defined as an amount of time power supplied to the fuel injector must be withdrawn for fuel flow from the injector to stop between fuel injections. In this example, the desired amount of fuel may be supplied to the cylinder in four fuel injections spanning the intake stroke of cylinder number one. However, in other examples, the number of fuel injections may be increased or decreased based on the engine speed, minimum fuel injector on time, and minimum fuel injector off time. At time $T_1$, no fuel is being purged from the fuel vapor storage canister so all fuel entering cylinder number one is via the sole fuel injector supplying fuel to cylinder number one.

Between time $T_1$ and time $T_2$, the purge control valve begins to open and fuel vapors begin to flow into the engine intake manifold. The fuel vapors mix with air entering the engine and therefore require less fuel to be injected to the cylinder to meet a desired amount of fuel in the cylinder.

At time $T_2$, fuel injection to cylinder number one begins for the second cycle of cylinder number one in FIG. 3. The engine is operated at the same speed and load between times $T_1$ and $T_2$. Therefore, the amount of air inducted to cylinder number one is the same between times $T_1$ and $T_2$. Further, the desired fuel amount for combustion cycles of cylinder number one beginning at times $T_1$ and $T_2$ is the same. However, since a portion of fuel entering cylinder number one is from purging fuel vapors in the fuel vapor storage canister, less fuel is injected to provide the same air-fuel ratio between the cylinder cycles beginning at times $T_1$ and $T_2$.

Less fuel may be injected to the cylinder during each single fuel injection event until the minimum fuel injector pulse width is reached. If the minimum fuel injector pulse width is reached, the number of fuel injections may be decreased and the amount of each fuel injected during each of the remaining fuel injections may be increased so as to provide the desired amount of fuel in the cylinder. When the number of fuel injections in a cylinder cycle is decreased, at least part of the amount of fuel injected during the eliminated fuel injection is added to the remaining number fuel injections. The pulse widths of each of the remaining fuel injections increase in duration so that the desired amount of fuel may be provided to the cylinder even though there is one less fuel injection event during the cylinder cycle. Thus, substantially a same amount of fuel enters cylinder number one during the intake strokes beginning at times $T_1$ and $T_2$. The number of fuel injections is decreased so that fuel mixing due to the three fuel injection events at time $T_2$ may not be as forceful as compared to when there are four fuel injections as shown at time $T_1$. However, since a portion of the fuel entering the cylinder is already in the form of vapors, the one less fuel injection event may be of less consequence and therefore low soot production may still be provided.

Thus, at time $T_2$, the number of fuel injections during a cylinder cycle is decreased in response to a condition where a first higher number of fuel injection events would inject more fuel than is desired if the fuel injector were operated at a minimum fuel injector pulse width. By decreasing the number of fuel injection events during the cylinder cycle, the fuel injector may deliver a desired amount of fuel to a cylinder at a fuel injection pulse width that is greater than the minimum fuel injection pulse width. In this way, the number of fuel injection events during a cylinder cycle may be adjusted to provide a maximum number of fuel injection events even in the presence of purging fuel vapors to the cylinder from a fuel vapor storage canister.

Between time $T_2$ and time $T_3$, the amount of fuel vapors entering the engine intake manifold and cylinder number one increases further. The amount of fuel vapors flowing to the engine may be increased via increasing a duty cycle supplied to a purge valve regulating flow from the fuel vapor canister.

At time $T_3$, the engine continues to operate at the same speed and load as during times $T_1$ and $T_2$. Therefore, the desired cylinder air amount and the desired cylinder fuel amount remain the same between times $T_1$, $T_2$, and $T_3$.

The amount of fuel vapors flowing to the engine via the fuel vapor storage canister has increased to a level that requires a reduction in the amount of injected fuel so that the desired fuel amount in the cylinder may be provided. Therefore, the amount of fuel injected during each fuel pulse is decreased from time $T_2$ to time $T_3$. If the fuel injector pulse width were not decreased, the cylinder air-fuel ratio would be reduced and result in a more rich air-fuel mixture. By reducing the fuel injection pulse width, the cylinder air-fuel mixture may be maintained at a desired ratio. At time $T_3$, the fuel injection pulse width has been decreased and is approaching the minimum fuel pulse width.

Between time $T_3$ and time $T_4$, the amount of fuel vapors entering the engine intake manifold and cylinder number one increases further. The amount of fuel vapors flowing to the engine may be increased over one or more cylinder cycles. In some examples, the amount of fuel vapors entering the engine cylinders may be measured via a hydrocarbon sensor or may be inferred via an oxygen sensor located in the exhaust of the engine.

At time $T_4$, the engine operates at the same speed and load as during times $T_1$, $T_2$, and $T_3$. Consequently, the desired cylinder air amount and the desired cylinder fuel amount remain the same between times $T_1$, $T_2$, $T_3$, and $T_4$.

The increase in fuel vapors entering the engine via the fuel vapor storage canister has reached a level where the desired amount of fuel in the cylinder cannot be provided via three fuel injections at the minimum fuel injector pulse width. Specifically, if fuel were injected to the cylinder in three separate injections of minimum fuel injector pulse width, more fuel than desired would be present in the cylinder. Therefore, the number of fuel injections to cylinder number one is decreased to two and the duration of each fuel pulse width is increased. As a result, the cylinder may be operated with the same desired fuel amounts at times $T_1$, $T_2$, $T_3$, and $T_4$ even though the amount of fuel vapor entering cylinder number one is increased.

In this way, the maximum number of fuel injection events may be provided to a cylinder during a cycle of the cylinder so as to reduce soot formation within the cylinder. Further, the number of fuel injection events may be adjusted to account for minimum fuel injection time, minimum fuel injector off time, and amount of fuel vapor provided to the cylinder. It should be recognized that the number of injection events, cylinder strokes, and fuel vapor fuel amount are shown simply for illustration purposes and are not meant to limit the scope of this disclosure.

Referring now to FIG. 4, a simulated fuel injection sequence during decreasing of purging of fuel vapors from a fuel vapor storage canister is shown. The sequence of FIG. 4 may be provided by the method of FIG. 5 executed via instructions of controller 12 in the system of FIG. 1. The plots of FIG. 4 are similar to those of FIG. 3. Therefore, for the sake of brevity only the differences will be described in FIG. 4.

The sequence starts at time $T_0$ where the engine is running and cylinder number one begins an exhaust stroke. Fuel is being purged from the fuel vapor storage canister at a relatively high rate at time $T_0$ and fuel injection is not present during the exhaust stroke. The fuel vapors do not enter cylinder number one until the intake valve of cylinder number one opens during the intake stroke of cylinder number one.

At time $T_1$, cylinder number one enters an intake stroke and fuel injection to cylinder number one begins. Fuel is injected in two fuel pulse widths and fuel vapors enter cylinder number one when the intake valve of cylinder number one opens. If fuel were injected to cylinder number one in three pulse widths corresponding to the minimum injector pulse width during the intake stroke beginning at time $T_1$, the total amount of fuel entering the cylinder via the fuel injector and the fuel vapor storage canister would exceed the desired fuel amount. Therefore, the number of fuel injections is limited to two fuel injections and the fuel injection pulse widths are greater than the minimum fuel injection pulse width.

Between time $T_1$ and time $T_2$, the purge control valve begins to close and fuel vapors flowing into the engine intake manifold are reduced. Alternatively, the amount of fuel vapors stored in the fuel vapor storage canister may be reduced as fuel vapors are depleted from the fuel vapor storage canister.

At time $T_2$, fuel injection to cylinder number one begins for a second cycle of cylinder number one in FIG. 3. The engine is operated at the same speed and load between times $T_1$ and $T_2$. Therefore, the amount of air inducted to cylinder number one is the same between times $T_1$ and $T_2$. Further, the desired fuel amount for combustion cycles of cylinder number one beginning at times $T_1$ and $T_2$ is the same. However, since the portion of fuel entering cylinder number one from purging fuel vapors in the fuel vapor storage canister is decreased, additional fuel is injected to cylinder number one to provide the same air-fuel ratio between the cylinder cycles beginning at times $T_1$ and $T_2$.

Additional fuel may be injected to cylinder number one by increasing the number of fuel injections at the minimum fuel injection time or greater during the intake stroke of cylinder number one. The number of fuel injections during a cylinder cycle may be increased if the amount of fuel entering the cylinder via the fuel vapor canister and the fuel injector does not exceed the desired fuel amount when fuel is injected at the minimum fuel pulse width. When the number of fuel injections in a cylinder cycle is increased, at least part of the amount of fuel injected during each of the previous number of fuel injections is added to the amount of fuel injected during the additional fuel injection during the cylinder cycle. Thus, substantially a same amount of fuel enters cylinder number one during the intake strokes beginning at times $T_1$ and $T_2$ even though the amount of fuel vapors entering the cylinder is decreasing. The number of fuel injections is increased so fuel mixing due to the three fuel injection events at time $T_2$ may be more forceful as compared to when there are two fuel injections as shown at time $T_1$.

Thus, at time $T_2$, the number of fuel injections during a cylinder cycle is increased in response to a condition where a first lower number of fuel injection events would not provide as much mixing in the cylinder as is possible with a maximum number of fuel injections. By increasing the number of fuel injection events during the cylinder cycle when fuel vapors flowing into the cylinder are decreasing, the fuel injector may improve fuel mixing in the cylinder and deliver a desired amount of fuel to a cylinder at a fuel injection pulse width that is greater than the minimum fuel injection pulse width. In this way, the number of fuel injection events during a cylinder cycle may be adjusted to provide a maximum number of injection events even in the presence of a decreasing amount of fuel vapors purged to the cylinder from a fuel vapor storage canister. Between time $T_2$ and time $T_3$, the amount of fuel vapors entering the engine intake manifold and cylinder number one decreases further.

At time $T_3$, the engine continues to operate at the same speed and load as during times $T_1$ and $T_2$. Therefore, the desired cylinder air amount and the desired cylinder fuel amount remain the same between times $T_1$, $T_2$, and $T_3$.

The amount of fuel vapors flowing to the engine via the fuel vapor storage canister has decreased to a level that requires an increase in the amount of injected fuel so that the desired fuel amount in the cylinder may be provided. Therefore, the amount of fuel injected during each fuel pulse is increased from time $T_2$ to time $T_3$. If the fuel injector pulse width were not increased, the cylinder air-fuel ratio would be increased and result in a more lean air-fuel mixture. By increasing the fuel injection pulse width, the cylinder air-fuel mixture may be maintained at a desired ratio. At time $T_3$, the fuel injection pulse width has been increased and is approaching an amount where an additional fuel injection may be provided at a minimum fuel pulse width or greater.

Between time $T_3$ and time $T_4$, the amount of fuel vapors entering the engine intake manifold and cylinder number one decreases further. The amount of fuel vapors flowing to the engine may be decreased over one or more cylinder cycles. In some examples, the amount of fuel vapors entering the engine cylinders may be measured via a hydrocarbon sensor or may be inferred via an oxygen sensor located in the exhaust of the engine.

At time $T_4$, the engine operates at the same speed and load as during times $T_1$, $T_2$, and $T_3$. Consequently, the desired cylinder air amount and the desired cylinder fuel amount remain the same between times $T_1$, $T_2$, $T_3$, and $T_4$.

The decrease in fuel vapors entering the engine via the fuel vapor storage canister has reached substantially zero and the desired amount of fuel can be provided to cylinder number one via four separate fuel injections during the cylinder cycle. Therefore, the number of fuel injections to the cylinder is increased while the fuel pulse width of each injection is decreased. As a result, the cylinder may be operated with the same desired fuel amounts at times $T_1$, $T_2$, $T_3$, and $T_4$ even though the amount of fuel vapor entering cylinder number one is decreasing.

In this way, the maximum number of fuel injection events may be provided to a cylinder during a cycle of the cylinder so as to reduce soot formation within the cylinder. Further, the number of fuel injection events may be adjusted to account for minimum fuel injection time, minimum fuel injector off time, and amount of fuel vapor provided to the cylinder. It should be recognized that the number of injection events, cylinder strokes, and fuel vapor fuel amount are shown simply for illustration purposes and are not meant to limit the scope of this disclosure.

It should also be mentioned that in some examples of the sequences of FIGS. 3 and 4, fuel injection may continue into at least part of the compression stroke. Consequently, a number of fuel injections that provide fuel that participates in combustion during a cylinder cycle may be adjusted to a maximum number when fuel vapors are purged or reduced to engine cylinders.

Figure 5:
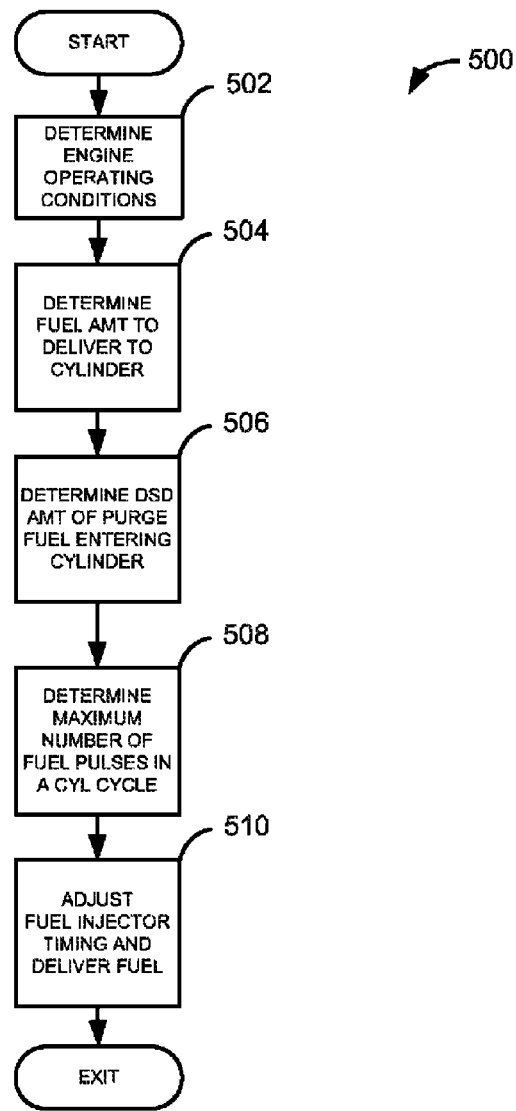
FIG. 5 shows a flowchart of an example method for operating an engine.

Referring now to FIG. 5, a method for operating an engine is disclosed. The method of FIG. 5 adjusts a number of fuel injections during a cycle of a cylinder, the fuel injections supplying fuel that participates in combustion within the cylinder. The number of fuel injections during a cylinder cycle is maximized in the presence or absence of fuel vapors being directed to engine from a fuel vapor storage canister.

At 502, method 500 determines engine operating conditions. Engine operating conditions may include but are not limited to engine speed, engine load, engine torque request, engine temperature, fuel vapor canister fuel vapor storage amount, and time since engine stop. Method 500 proceeds to 504 after engine operating conditions are determined.

At 504, method 500 determines an amount of fuel (fuel_lbm) to deliver to one or more engine cylinders during a cycle of the cylinder. In one example, the fuel amount may be determined via multiplying an amount of air entering a cylinder by a desired air-fuel ratio. The desired air-fuel ratio may be empirically determined and stored in a table or function that is indexed using engine operating conditions. For example, it may be determined that a desired engine air-fuel ratio is 14:1 during engine starting conditions where the engine is partially warmed. The air-fuel ratio may be adjusted (e.g., richened or made leaner) for different engine operating conditions and to improve catalyst efficiency. The air entering a cylinder may be determined via a mass air flow sensor or via an intake manifold pressure sensor and the ideal gas law PV=nRT, where P is pressure in the engine cylinder, V is the cylinder volume, n is the number of moles of air, R is a gas constant, and T is temperature in degrees Kelvin.

In other examples, the cylinder fuel amount may be based on a desired or requested engine torque amount. The requested engine torque is converted into a desired air mass and a desired fuel amount to provide the desired engine torque amount. One such method is described in U.S. Pat. No. 7,321, 821 which is hereby fully incorporated by reference for all intents and purposes. Method 500 proceeds to 506 after the desired fuel amount to be provided to the cylinder is determined.

At 506, method 500 determines a desired amount of purged fuel vapors entering engine cylinders. Alternatively, an actual amount of fuel vapors entering a cylinder may be determined. In one example, the amount of fuel vapors entering a cylinder via the fuel vapor storage canister (vapor_lbm) may be determined as described in U.S. Pat. No. 6,523,531 which is hereby fully incorporated by reference for all intents and purposes. The canister purge fuel flow rate in pounds mass per minute from the fuel vapor storage canister may be converted to fuel mass flow per cylinder event via multiplying the canister purge flow rate by the number of minutes per each cylinder induction event. Further, the canister purge flow rate and concentration of hydrocarbons (e.g., air-fuel ratio of purge vapor mixture) flowing from the canister to the engine cylinders may be adjusted for engine operating conditions (e.g., engine temperature, stored vapor amount). Method 500 proceeds to 508 after the canister purge fuel vapor mass flowing into the engine cylinder is determined.

At 508, method 500 determines the maximum number of fuel injections during a cylinder cycle. In one example, the maximum number of fuel injections may be determined based on engine speed, minimum fuel injector pulse width, and minimum fuel injector off time. In particular, a total available fuel injection period may be determined from the following equation:

$$\text{tot\_avail\_inj\_period} = \text{crankshaft\_deg\_duration} \cdot 1/N \cdot 1\text{rev}/360 \text{ degrees}$$

where tot_avail_inj_period is a total amount of time that injection of fuel is permitted, crankshaft_deg_duration is a predefined crankshaft interval where fuel injection is permitted in crankshaft degrees (e.g., TDC intake stroke to 20 crankshaft degrees after BDC intake stroke), and where N is engine speed in RPM. The variable tot_inj_period may then be divided by the sum of the minimum fuel injector pulse width and the minimum fuel injector off time expressed as:

$$\text{tot\_tim\_limited\_injections} = \text{int}(\text{tot\_inj\_period} \div (\text{min\_inj\_on\_pw} + \text{min\_inj\_off\_tm}))$$

where tot_tim_limited_injections is the total number of fuel injections limited by the amount of time available to inject fuel, where min_inj_on_pw is the minimum fuel injector on pulse width, where the min_inj_off tm is the minimum fuel injector off time, and where int is a function that returns the integer portion of the operation in parenthesis. Thus, the integer portion of the result is the total number of fuel injections possible at the present engine operating conditions (e.g., at the present engine speed). Method 500 proceeds to 510 after the total number of fuel injections constrained by available time to inject fuel is determined.

At 510, method 500 adjusts fuel injector timing to deliver the maximum number of fuel injections during the allotted engine crankshaft interval in the presence or absence of purging fuel vapors from the fuel vapor storage canister. In one example, Method 500 begins by subtracting the amount of purged fuel vapors (vapor_lbm) entering the cylinder determined at 506 from the amount of fuel desired in the cylinder (fuel_lbm) as determined at 504. The result is the total amount of fuel to be injected to the cylinder (inj_lbm) during the subsequent cylinder cycle.

The total amount of fuel to be injected to the cylinder (inj_lbm) during the subsequent cylinder cycle is divided by the mass of fuel injected by the fuel injector when the fuel injector is operated at the minimum fuel injector pulse width to determine a maximum number of fuel injections possible to inject the total amount of fuel to be injected during the cylinder cycle when the fuel is injected at a minimum pulse width of the fuel injector. The operation may be expressed as:

$$\text{max\_num\_inj} = \text{int}(\text{inj\_lbm} \div \text{mass\_inj\_min\_pw})$$

where max_num_inj is a maximum number of fuel injections during the cylinder cycle to provide the desired amount of fuel to the cylinder and where max_num_inj is constrained by the minimum fuel injector pulse width, inj_lbm is the total amount of fuel to be injected to the cylinder, and where mass_inj_min_pw is the mass of fuel injected when the fuel injector is operated at the minimum fuel pulse width and the minimum injector off time.

Thus, method 500 adjusts the number of fuel injections based on the desired engine air-fuel ratio as well as the purge vapor air-fuel ratio and purge total flow rate. For example, if the concentration of fuel vapors flowing to a cylinder increases, the number of fuel injections can be decreased. Similarly, if the concentration of fuel vapors flowing to the cylinder decreases, the number of fuel injections can be increased. If the desired engine air-fuel ratio is richened, the number of fuel injections can be increased. If the desired engine air-fuel ratio is leaned, the number of fuel injections can be reduced.

Method 500 determines the maximum number of fuel injections into a cylinder during a cycle of the cylinder by taking the minimum of the total number of time limited injections (tot_tim_limited_injections) and the total number of minimum fuel pulse width limited injections (max_num_inj), expressed as:

$$tot\_num\_inj = min(max\_num\_inj, tot\_tim\_limited\_injections)$$

where tot_num_inj is the number of fuel injections to be provided during the subsequent fuel injection period. In this way, method 500 selects the maximum number of fuel injections during a cylinder cycle taking into account the minimum fuel injector pulse width, the minimum fuel injector off time, and the minimum amount of fuel injected during operation of the fuel injector at the minimum fuel pulse width.

Method 500 determines the amount of fuel to inject during each fuel injection of the cylinder cycle by dividing the mass of fuel to be injected (inj_lbm) by the total number of fuel injections (tot_num_inj). The mass of fuel to inject during each of the injections is then converted into a fuel injector pulse width via indexing a fuel injector transfer function as shown in FIG. 2 with the fuel mass to inject during each injection. The fuel injector transfer function outputs the fuel injector on time which is output to the fuel injector beginning at the fuel injection interval described at 508 and after each fuel injector off time. In some examples, the fuel injector off time may be the minimum fuel injector off time. Further, the injector turn on time and turn off times may be adjusted based on the number of fuel injections. For example, the determined number of fuel injections may be evenly spaced in time or crankshaft angle over the desired fuel injection interval. Alternatively, the fuel injection pulses may be spaced unevenly in time or relative to crankshaft position. In one example, the specific injector on and off times may be retrieved from a table or function that holds empirically determined injector open (e.g., on) and close (e.g., off) times that may be indexed based on the desired number of fuel injections, engine speed, and engine load.

Method 500 may also limit an amount of fuel vapor entering a cylinder via holding or reducing a duty cycle of a purge control valve so as to adjust fuel vapor purge flow rate when a number of fuel injections during a cylinder cycle reaches a threshold level. For example, if it is desired to inject fuel at least twice during a cylinder cycle, the purge flow may be limited to a threshold amount by limiting a duty cycle of a purge valve. In a case where two fuel injections are desired and the engine air-fuel ratio is limited to a threshold rich limit, the purge flow rate may be reduced to allow two fuel injections. Thus, if desired, a minimum number of fuel injections may be provided during conditions where multiple fuel injection events are desired.

Additionally, method 500 may adjust spark timing and the number of spark events delivered to the cylinder as the number of fuel injections changes. For example, if the number of fuel injections increases, spark timing may be retarded from base spark timing (e.g., spark timing based on engine speed and load) to accommodate the additional number of fuel injections. If the number of fuel injections decreases, spark timing may be advanced from base spark timing.

Method 500 may also adjust cam timing as the number of fuel injections is adjusted. For example, cam timing may be retarded as a number of fuel injections increase so as to hold an intake valve open later in a compression stroke. Later intake valve closing may help to further mix cylinder contents. In this way, soot formation may be further reduced. Method 500 exits after the number and duration of fuel injections during a cylinder cycle are determined.

Fuel injector on and off times of each fuel injector of the engine may be determined according to the method of FIG. 5. Further, the method of FIG. 5 may be repeated each engine cycle for each fuel injector. In this way, the number of fuel injections during each cylinder cycle may be updated based on the amount of fuel vapors entering the cylinder from the fuel vapor storage canister, the minimum fuel injector on time or pulse width, and the minimum fuel injector off time.

Thus, the method of FIG. 5 provides for operating an engine, comprising: supplying an amount of fuel from a fuel vapor storage canister to a cylinder; and adjusting a number of fuel pulses supplied to the cylinder via a fuel injector during a cycle of the cylinder in response to the amount of fuel supplied to the cylinder during the cycle of the cylinder from the fuel vapor storage canister. In this way, the number of fuel injections during a cylinder cycle may be maximized to increase cylinder mixing.

The method of FIG. 5 also provides for where the amount of fuel is directly injected to the cylinder, and where a pulse width of at least one fuel pulse supplied to the cylinder is reduced as the amount of fuel supplied to the cylinder from the fuel vapor storage canister increases. The method includes where the number of fuel pulses supplied to the cylinder are supplied during an intake stroke of the cylinder. The method also includes where the number of fuel pulses supplied to the cylinder are supplied during an intake stroke and a compression stroke of the cylinder. The method further comprises limiting the amount of fuel supplied from the fuel vapor storage canister to the cylinder to maintain a minimum number of fuel pulses supplied to the cylinder via a fuel injector. The method also includes where the number of fuel pulses supplied to the cylinder is further based on an engine torque request.

In some examples, the method of FIG. 5 also provides for operating an engine, comprising: supplying an amount of fuel from a fuel vapor storage canister to a cylinder; and adjusting a number of fuel pulses supplied to the cylinder via a fuel injector during a cylinder cycle in response to the amount of fuel supplied to the cylinder from the fuel vapor storage canister during the cylinder cycle and a minimum pulse width of the fuel injector. Thus, the method accounts for a minimum fuel injector pulse width where repeatable amounts of injected fuel may be provided when the injector is operated at rated voltage and fuel pressure.

The method also includes where the minimum pulse width of the fuel injector is a fuel pulse width where a substantially repeatable minimum amount of fuel is delivered via the fuel injector. The method further includes where the number of fuel pulses supplied to the cylinder is further based on a minimum fuel injector off time. The method also includes where the number of fuel pulses supplied to the cylinder is further based on an engine torque request.

In some examples, the method includes where the number of fuel pulses supplied to the cylinder is further based on an amount of fuel delivered to the cylinder when the fuel injector is operated at the minimum pulse width. The method also includes where the number of fuel pulses are supplied to the cylinder are supplied during an intake stroke of the cylinder. The method also includes where at least one fuel pulse supplied by the fuel injector during the cylinder cycle is supplied during a compression stroke of the cylinder. Thus, the interval over which a number of fuel injections occur during a cylinder cycle can vary with operating conditions. Finally, the method includes where the amount of fuel supplied from the fuel vapor storage canister to the cylinder is adjusted via adjusting a duty cycle supplied to a purge control valve.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
   supplying an amount of fuel from a fuel vapor storage canister containing activated carbon to an intake manifold upstream of a cylinder; and
   adjusting an actual total number of fuel pulses supplied to the cylinder via a fuel injector during a cycle of the cylinder in response to the amount of fuel supplied to the intake manifold during the cycle of the cylinder from the fuel vapor storage canister containing activated carbon.

2. The method of claim 1, where a pulse width of at least one fuel pulse supplied to the cylinder is reduced as the amount of fuel supplied to the intake manifold from the fuel vapor storage canister containing activated carbon increases.

3. The method of claim 1, where the number of fuel pulses supplied to the cylinder is supplied during an intake stroke of the cylinder, and where fuel supplied from the fuel vapor storage canister containing activated carbon is introduced to the engine in the intake manifold upstream of the fuel injector.

4. The method of claim 1, where the actual total number of fuel pulses supplied to the cylinder is supplied during an intake stroke and a compression stroke of the cylinder, and where the fuel vapor storage canister containing activated carbon is apart from a fuel tank supplying the fuel injector.

5. The method of claim 1, further comprising limiting the amount of fuel supplied from the fuel vapor storage canister containing activated carbon to the cylinder to maintain an actual total minimum number of fuel pulses supplied to the cylinder via the fuel injector.

6. The method of claim 1, where the actual total number of fuel pulses supplied to the cylinder is further based on an engine torque request.

7. A method for operating an engine, comprising:
   supplying an amount of fuel from a fuel vapor storage canister containing activated carbon to a cylinder via an intake manifold and fuel vapor purge valve; and
   adjusting an actual total number of fuel pulses supplied to the cylinder via a fuel injector during a cylinder cycle in response to the amount of fuel supplied to the cylinder from the fuel vapor storage canister containing activated carbon during the cylinder cycle and a minimum pulse width of the fuel injector.

8. The method of claim 7, where the minimum pulse width of the fuel injector is a non-zero fuel pulse width where a repeatable non-zero minimum amount of fuel is delivered via the fuel injector.

9. The method of claim 7, where the actual total number of fuel pulses supplied to the cylinder is further based on a minimum fuel injector off time, and where the fuel vapor storage canister containing activated carbon is apart from a fuel tank supplying the fuel injector.

10. The method of claim 7, where the actual total number of fuel pulses supplied to the cylinder is further based on an engine torque request.

11. The method of claim 7, where the actual total number of fuel pulses supplied to the cylinder is further based on an amount of fuel delivered to the cylinder when the fuel injector is operated at the minimum pulse width.

12. The method of claim 7, where the actual total number of fuel pulses supplied to the cylinder is supplied during an intake stroke of the cylinder.

13. The method of claim 7, where at least one fuel pulse supplied by the fuel injector during the cylinder cycle is supplied during a compression stroke of the cylinder.

14. The method of claim 7, where the amount of fuel supplied from the fuel vapor storage canister containing activated carbon to the cylinder is adjusted via adjusting a duty cycle supplied to a purge control valve.

15. A system for controlling an engine, comprising:
   an engine;
   a fuel vapor storage canister;
   a fuel injector supplying fuel to a cylinder of the engine; and
   a controller including instructions for injecting fuel to the cylinder in an actual total number of fuel pulses during a cycle of the cylinder, the controller including further instructions to supply fuel to the cylinder via the fuel vapor storage canister containing activated carbon, the controller including further instructions to adjust the actual total number of fuel pulses during a cylinder cycle in response to a non-zero amount of fuel delivered when the fuel injector is operated at a minimum pulse width and an amount of fuel supplied to an intake manifold of the engine via the fuel vapor storage canister containing activated carbon.

16. The system of claim 15, further comprising additional instructions to maximize the actual total number of fuel pulses during the cycle of the cylinder, and where the fuel vapor storage canister containing activated carbon is apart from a fuel tank supplying the fuel injector.

17. The system of claim 15, further comprising an air intake system supplying air to cylinders of the engine, and where the fuel vapor storage canister containing activated carbon is in communication with the air intake system.

18. The system of claim 17, further comprising a fuel vapor purge valve, and where the controller includes further instructions for adjusting a duty cycle of the fuel vapor purge valve to adjust flow of fuel vapors to the cylinder.

19. The system of claim 15, further comprising additional instructions to decrease a pulse width of at least one fuel pulse in response to the amount of fuel supplied to the cylinder via the fuel vapor storage canister containing activated carbon.

20. The system of claim 19, further comprising additional instructions for decreasing the actual total number of fuel pulses supplied to the cylinder when at least one fuel pulse supplied to the cylinder is the minimum pulse width of the fuel injector.

\* \* \* \* \*